United States Patent
Miftakhov et al.

(10) Patent No.: US 11,949,133 B1
(45) Date of Patent: Apr. 2, 2024

(54) LIQUID WATER FROM FUEL CELL EXHAUST FOR CABIN HUMIDITY CONTROL

(71) Applicant: ZeroAvia, Inc., Hollister, CA (US)

(72) Inventors: Valery Miftakhov, San Carlos, CA (US); Bob L. Mackey, San Jose, CA (US); Jacob T. Needels, Palo Alto, CA (US)

(73) Assignee: ZEROAVIA, INC., Hollister, CA (US)

( * ) Notice: Subject to any disclaimer, the term of this patent is extended or adjusted under 35 U.S.C. 154(b) by 0 days.

(21) Appl. No.: 18/338,205

(22) Filed: Jun. 20, 2023

(51) Int. Cl.
- *H01M 8/04119* (2016.01)
- *H01M 8/04746* (2016.01)
- *H01M 8/04828* (2016.01)

(52) U.S. Cl.
CPC ... *H01M 8/04141* (2013.01); *H01M 8/04761* (2013.01); *H01M 8/04776* (2013.01); *H01M 8/04843* (2013.01); *H01M 2250/20* (2013.01)

(58) Field of Classification Search
CPC ......... H01M 8/04014; H01M 8/04111; H01M 8/04141; H01M 8/04149; H01M 8/04156; H01M 8/04164; H01M 8/04171; H01M 8/04179; H01M 8/04507; H01M 8/04522; H01M 8/04492; H01M 8/04828; H01M 8/04843; H01M 8/04761; H01M 8/04776; H01M 2250/20
See application file for complete search history.

(56) References Cited

U.S. PATENT DOCUMENTS

| | | | |
|---|---|---|---|
| 2008/0210812 A1* | 9/2008 | Gans | H01M 8/04201 244/58 |
| 2008/0299432 A1* | 12/2008 | Hoffjann | B64D 13/00 429/456 |
| 2010/0028741 A1* | 2/2010 | Hoffjann | H01M 8/04089 429/456 |
| 2015/0008706 A1* | 1/2015 | Obadia | B60N 2/56 297/188.08 |
| 2015/0068630 A1* | 3/2015 | Libis | H01M 8/04089 137/899 |
| 2018/0002030 A1* | 1/2018 | Klassen | B64C 1/1407 |
| 2022/0324299 A1 | 10/2022 | Jeong et al. | B60H 3/02 |
| 2023/0011951 A1 | 1/2023 | Jung et al. | B60H 3/02 |

* cited by examiner

*Primary Examiner* — Matthew W Van Oudenaren
(74) *Attorney, Agent, or Firm* — HAYES SOLOWAY P.C.

(57) ABSTRACT

Disclosed is a system for humidifying cabin and/or cockpit air of a fuel cell-powered aircraft system. The system includes a fuel cell stack configured for reacting hydrogen and oxygen to produce electrical energy and a cathode exhaust containing moist, warm air; a water separator configured to cool the moist, warm air and to condense and separate liquid water from the moist, warm air; and a humidifier configured to employ the separated liquid water to humidify pressurized cabin air.

17 Claims, 6 Drawing Sheets

LIQUID WATER FROM FUEL CELL EXHAUST FOR CABIN HUMIDITY CONTROL

TECHNICAL FIELD

The present disclosure relates to hydrogen fuel cell electric engine systems for use with aircraft and will be described in connection with such utility, although other utilities are contemplated.

BACKGROUND AND SUMMARY

Exhaust emissions from transport vehicles are a significant contributor to climate change. Conventional fossil fuel powered aircraft engines release $CO_2$ emissions. Also, fossil fuel powered aircraft emissions include non-$CO_2$ effects due to nitrogen oxides (NOx), vapor trails, and cloud formation triggered by the altitude at which aircraft operate. These non-$CO_2$ effects are believed to contribute twice as much to global warming as aircraft $CO_2$ and are estimated to be responsible for two-thirds of aviation's climate impact. Additionally, the high-speed exhaust gasses of conventional fossil-fuel-powered aircraft engines contribute significantly to the extremely large noise footprint of commercial and military aircraft, particularly in densely populated areas.

Rechargeable battery powered terrestrial vehicles, i.e., "EVs", are slowly replacing conventional fossil fuel powered terrestrial vehicles. However, the weight of batteries and limited energy storage of batteries makes rechargeable battery-powered aircraft generally impractical.

Hydrogen fuel cells offer an attractive alternative to fossil-fuel-burning engines. Hydrogen fuel tanks may be quickly filled and store significant energy and, other than the relatively small amount of unreacted hydrogen gas, the reaction output exhausted from hydrogen fuel cells comprises essentially only water.

Conditions onboard aircraft dry out a person's membranes. Dried-out nasal membranes are more likely to be penetrated by viruses. It has been reported that as many as 20% of aircraft passengers contract some form of sore throat or other infection within five days of a flight.

Air humidification systems have been in use in aircraft flight decks to improve crew and passenger comfort. A more humid atmosphere also lessens the risk of static discharge which can damage electrical components. Additionally, taste and aroma perceptions are enhanced in moister atmospheres which means that air carriers do not need to dose their in-flight meals with as much sugar and salt to boost passengers' perceptions of flavors.

US Published Application Nos. 2022/0324299 and 2023/0011951 propose systems for humidifying a fuel cell powered electric land vehicle using water generated during electricity generation in the fuel cell stack. However, motor vehicle fuel cell systems are operated near sea level. Humidification of pressurized aircraft cabins and cockpits provides additional technical challenges.

Air humidification systems add weight. Particularly of significance is weight added in water stores for use in humidification of the cabin air.

Depending on the length of the flight, storing sufficient water onboard to last an entire flight may add several hundred pounds of water to the takeoff weight of an aircraft. In the case of aircraft, even small amounts of added weight increase fuel consumption and reduce range.

Since the exhaust from hydrogen fuel cells comprises essentially only water, in accordance with the present disclosure, we harvest liquid water from the fuel cell cathode exhaust and use that water to humidify the interior atmosphere of the aircraft.

More particularly, in accordance with the present disclosure, fuel cell exhaust is passed through a condenser to harvest liquid water from the exhaust. The harvested water is then supplied to a humidifier where it is introduced into pressurized, conditioned air circulating in the aircraft cabin and/or cockpit. In one embodiment, the air is humidified after compression (i.e., compressor upstream of the humidifier). In another embodiment, the air is humidified before being compressed. In other embodiments, the humidifier adds water to pressurized, conditioned air supplied to pressurize the aircraft cabin and/or cockpit.

In one aspect, the cathode exhaust is passed through a turbine to expand and cool the exhaust before the exhaust is passed to a condenser where water is harvested from the cathode exhaust.

In another aspect, the humidification system includes a control system configured to regulate the amount of water harvested from the fuel cell exhaust introduced into the aircraft pressurized interior cabin and/or cockpit.

In yet another aspect, the control system is configured to regulate the amount of harvested water used to humidify aircraft interior air to control the humidity to a preset range.

Since the amount of water produced by the fuel cell is expected to exceed the amount of water required for humidification of the aircraft interior air, excess harvested water can be stored in a tank for later use, or the excess harvested water may be discarded overboard to minimize weight. At the onset of a flight, i.e., at takeoff, humidification of the aircraft interior air generally is not required, and water weight is minimized to reduce the amount of energy required by the aircraft to takeoff and climb. Later in the flight, water harvested from the fuel cell exhaust may be stored onboard since the weight of the stored water is beneficial to increase the speed or range of a gliding descent. Once on the ground, the stored water may largely be discarded since additional water will be created upon takeoff and climb in the next flight.

The harvested water also may be used for supplying lavatory sinks on the aircraft and/or, since the harvested water is potable, the harvested water can be used for drinking. Since the harvested water is essentially mineral-free, minerals could be added to the water to improve taste. Alternatively, the harvested water can be used for brewing coffee or tea. In one embodiment, sensors are provided to detect the presence and amount of hydrogen present in the harvested water or the humidified air. However, as a practical matter, the amount of hydrogen present in the harvested water or humified air ordinarily will be quite insignificant.

In still yet another aspect, the fuel cell system may include an anode tail oxidizer (ATO) which has the benefit of increasing energy recoverable by the turbine and also to increase the water content of the fuel cell exhaust. The ATO has an advantage of removing any waste hydrogen from the fuel cell anode exhaust stream.

In yet another aspect, the fuel cell system compressor which is used to increase pressure for the fuel cell cathode air supply is also for aircraft interior air pressurization.

More particularly, according to one aspect of the disclosure, we provide a system for humidifying cabin and/or cockpit air of a fuel cell-powered aircraft system comprising: a fuel cell configured for reacting hydrogen and oxygen to produce electrical energy and a cathode exhaust comprising moist warm air; a water separator configured to condense and separate liquid water from the moist warm air; an air system configured to circulate pressurized air through and/or introduce pressurized air into the cabin and/or cockpit; and a humidifier configured to employ the separated liquid water to humidify the cabin and/or cockpit air.

In one aspect, the pressurized air comprises cabin and/or cockpit recirculated air.

In another aspect, the pressurized air comprises exterior air.

In still another aspect, the pressurized air comprises air bled from the fuel cell compressor.

In one aspect, the water separator comprises a condenser.

In another aspect, the system further comprises a turbine upstream of the air-cooled condenser.

In a further aspect, the water separator includes an heat exchanger and a water separator between the turbine and the humidifier.

In yet another aspect, the system comprises a tank configured for storing the separated liquid water upstream of the humidifier.

In a further aspect the system includes a pump configured to pump the separated liquid water from the tank to the humidifier.

In yet another aspect, the tank includes a water overflow for discharging excess separated liquid water from the tank.

In a further aspect the system comprising a controller configured to control the humidifier, the pump, and/or water overflow.

In yet another aspect, the system includes an air compressor upstream of the fuel cell wherein the air compressor is configured to deliver compressed air to the fuel cell and to deliver pressurized air to the cabin and/or cockpit.

In a further aspect, the system includes an anode tail oxidizer downstream of the fuel cell and upstream of the turbine, configured to combust unburned hydrogen gas exiting the fuel cell.

In another aspect, the system includes a controller configured to control the humidifier to maintain humidity of the pressurized air to a setpoint, e.g., about 40%.

The disclosure also provides a method for humidifying cabin and/or cockpit air of an aircraft powered by a fuel cell, comprising the steps providing a system for humidifying cabin and/or cockpit air of a fuel cell powered aircraft as above described; and controlling the humidifier to add humidity to air circulating through the cabin and/or cockpit to a setpoint.

In one aspect the system includes a tank for storing water separated by the steps of disposing of excess liquid water to minimize aircraft weight for takeoff and climb.

In another aspect the excess liquid water is stored in the tank to increase speed or range of a gliding descent of the aircraft.

In a further aspect the excess liquid water is used to supply consumption onboard the aircraft.

In still yet another aspect, the system includes an anode tail oxidizer (ATO) configured to combust unburned hydrogen exiting the fuel cell, including the step of harvesting water from the combustion of the unburned hydrogen.

In yet another aspect, the humidifier adds humidity to the cabin air and/or cockpit air prior to it being compressed.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Further features and advantages of the disclosure will be seen in the following detailed description, taken in conjunction with the accompanying drawings. The drawings described herein are for illustrative purposes only of selected embodiments and not all possible implementations and are not intended to limit the scope of the present disclosure.

In the drawings.

DETAILED DESCRIPTION

Example embodiments will now be described more fully with reference to the accompanying drawings. Example embodiments are provided so that this disclosure will be thorough and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers, and/or sections, these elements, components, regions, layers, and/or sections should not be limited by these terms. These terms may be only used to distinguish one element, component, region, layer, or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, "cabin" and "cockpit" are used collectively and/or interchangeably for the aircraft interior.

Figure 1:
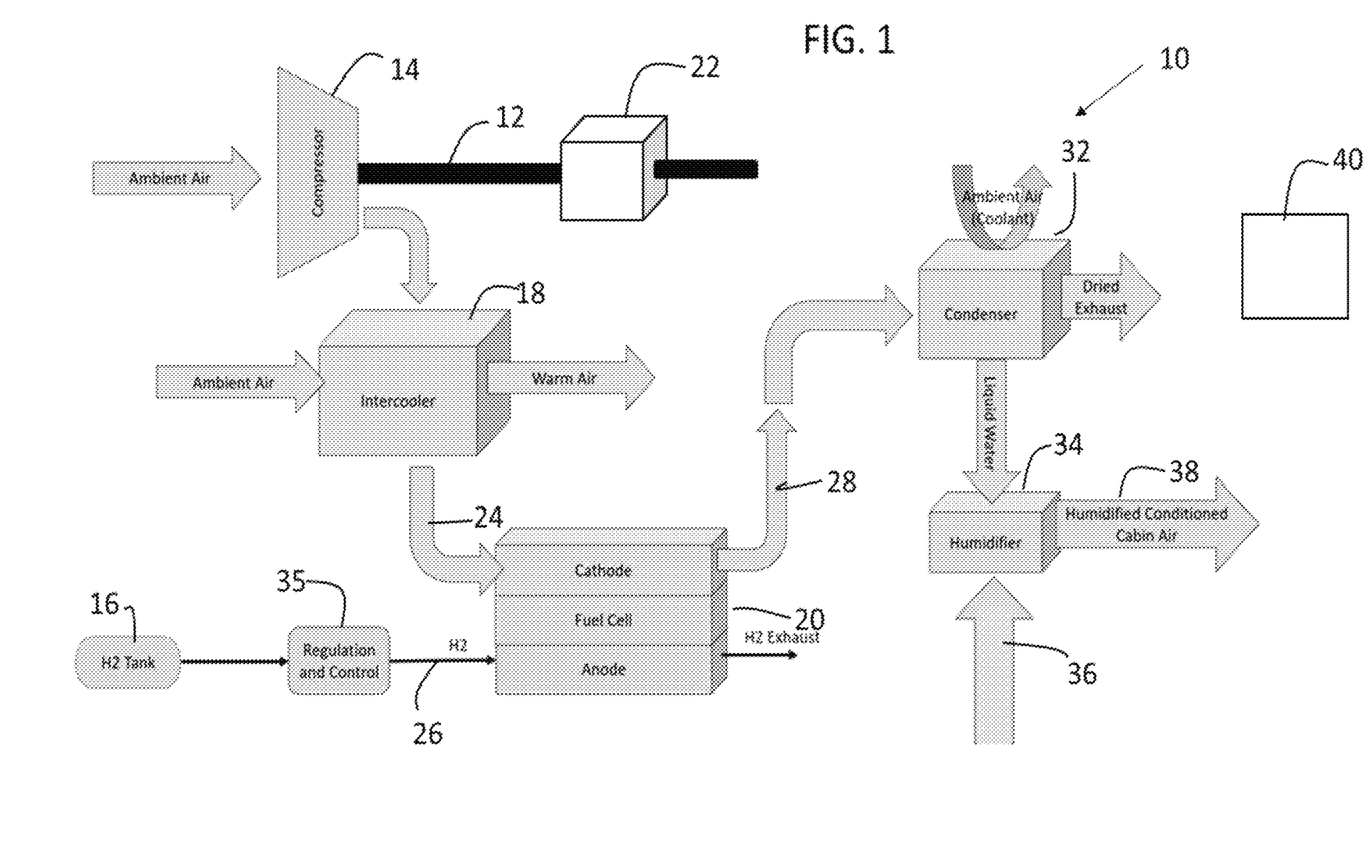
FIG. 1 is a schematic view of a liquid water exhaust harvesting system for aircraft interior air humidification in accordance with the present disclosure.

FIG. 1 is a schematic view of an integrated hydrogen-electric system 10 that can be utilized, for example, in an aircraft turboprop or turbofan system, including an aircraft interior air humidifier system in accordance with the present disclosure. Integrated hydrogen-electric system includes an elongated shaft 12 that extends through the entire power train of integrated hydrogen-electric engine system 10 to function as a common shaft for the various components of the power train. Elongated shaft 12 supports a propulsor, e.g., a fan or propeller (not shown) and an air compressor system 14 (e.g., a single-stage compressor or a multi-stage compressor comprising one or more centrifugal and axial stages) in fluid communication with a fuel source, e.g., hydrogen tank 16, a heat exchanger radiator or intercooler 18 in fluid communication with the compressor system 14, a fuel cell stack 20 in fluid communication with heat exchanger or intercooler 18, and an electric motor assembly 22 in electrical communication with fuel cell stack 20. Intercooler 18 is configured to cool compressed air received from air compressor 14 by heat exchange with ambient air. In operation, compressed air from intercooler 18 is introduced into the cathode inlet 24 where the air is reacted with hydrogen gas introduced into the anode inlet 26, producing electricity for driving motor 22 and producing a cathode reactant gaseous exhaust stream which is exhausted via cathode exhaust 28. Metering of air and hydrogen fuel to the fuel cell 20 is controlled via regulation and control module 35. Up to this point, as described, the integrated hydrogen fuel cell electric motor system 10 is conventional.

In accordance with the present disclosure, the cathode exhaust 28, from fuel cell 20, which comprises primarily moist, warm air typically containing 10-25% water vapor by mass, is passed to condenser 32 where the water is condensed to liquid and the liquid water passed to a humidifier 34 for use to humidify the dry, conditioned, cabin and/or cockpit air 36, which comprises exterior air introduced to the cabin and/or cockpit (e.g., air bled from the compressor), recirculated cabin and/or cockpit air, or a combination of introduced and recirculated air. Humidified air is then delivered to the aircraft cabin and/or cockpit via air passage 38.

Humidifier 34 may comprise a conventional humidifier which includes wicking pads (not shown). Humidifier 34 also may comprise an ultrasonic element for converting the liquid water to a mist of fine droplets which are then released into the dry, conditioned, cabin and/or cockpit air. Alternatively, humidifier 34 may comprise one or more rotating elements or impellors configured to throw water at a diffuser, which breaks the water into finer droplets which then evaporate and add humidity to the dry, conditioned, cabin and/or cockpit air.

Operation of humidifier 34 is controlled by controller 40 to maintain a setpoint cabin humidity, typically about 40% relative humidity. When the relative humidity is lower than setpoint, the amount of water added to the conditioned air from the cabin and/or cockpit by humidifier 34 is increased. Similarly, when humidity is greater than desired, the amount of water added to the conditioned air from the cabin and/or cockpit is decreased.

Figure 2:
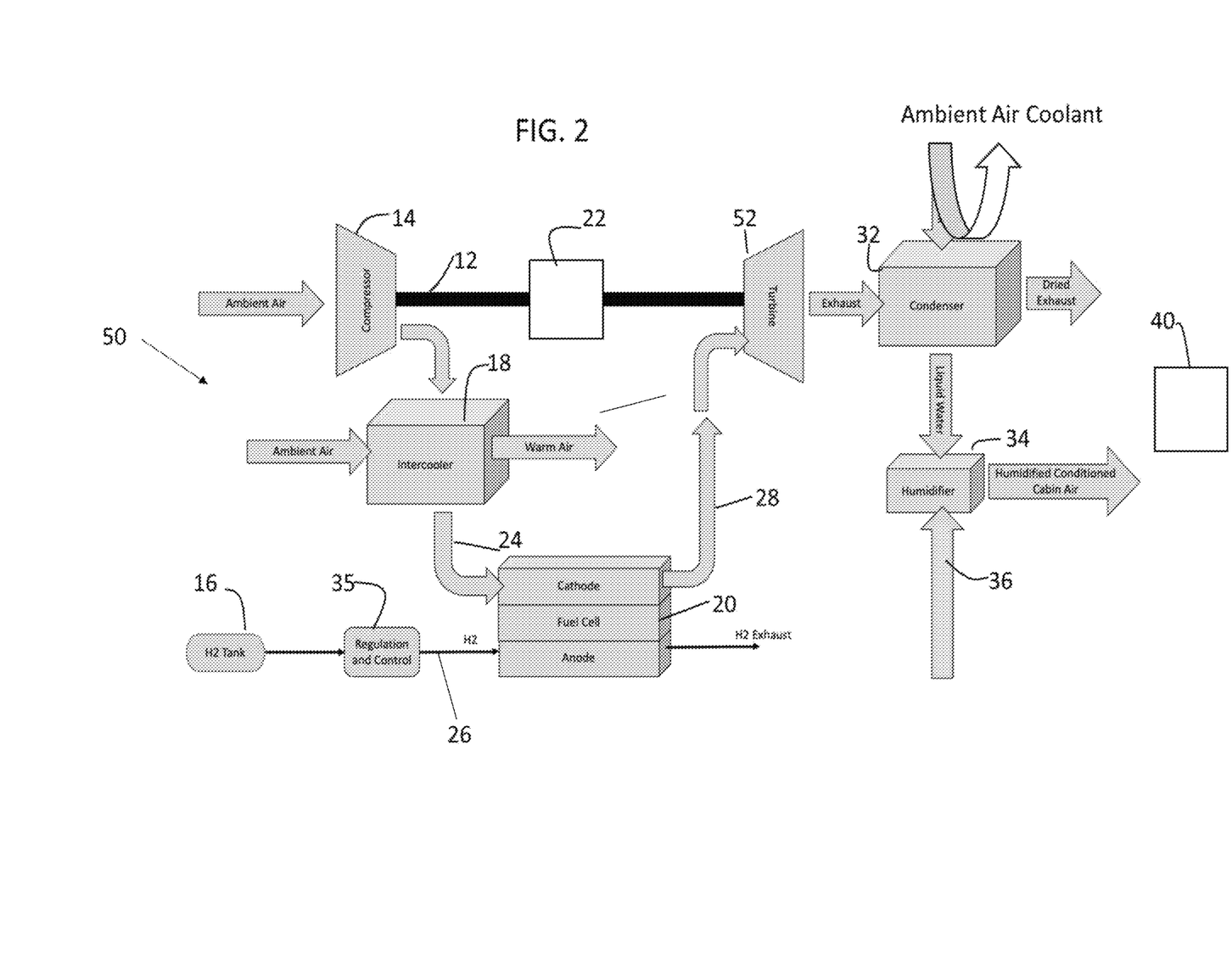
FIG. 2 is a schematic view similar to FIG. 1 and illustrates liquid water harvesting for cabin and/or cockpit air humidification from a fuel cell exhaust system in accordance with a second embodiment of the disclosure.

FIG. 2 illustrates another embodiment of an integrated hydrogen-electric system incorporating liquid water exhaust harvesting for cabin and/or cockpit air humidification. The integrated hydrogen-electric system 50 is similar to integrated hydrogen-electric system 10 illustrated in FIG. 1. However, in system 50, the cathode exhaust 28 is first passed through a turbine 52, wherein energy is harvested from the cathode exhaust for useful purposes (e.g., supplied to shaft 12 to power compressor 14, or to drive a generator), and the exhaust is expanded and cooled before being passed to condenser 32, where liquid water is condensed from the moisture-laden exhaust, and the liquid water is employed to humidify the dry, conditioned, cabin and/or cockpit air in humidifier 34, as before.

Figure 3:
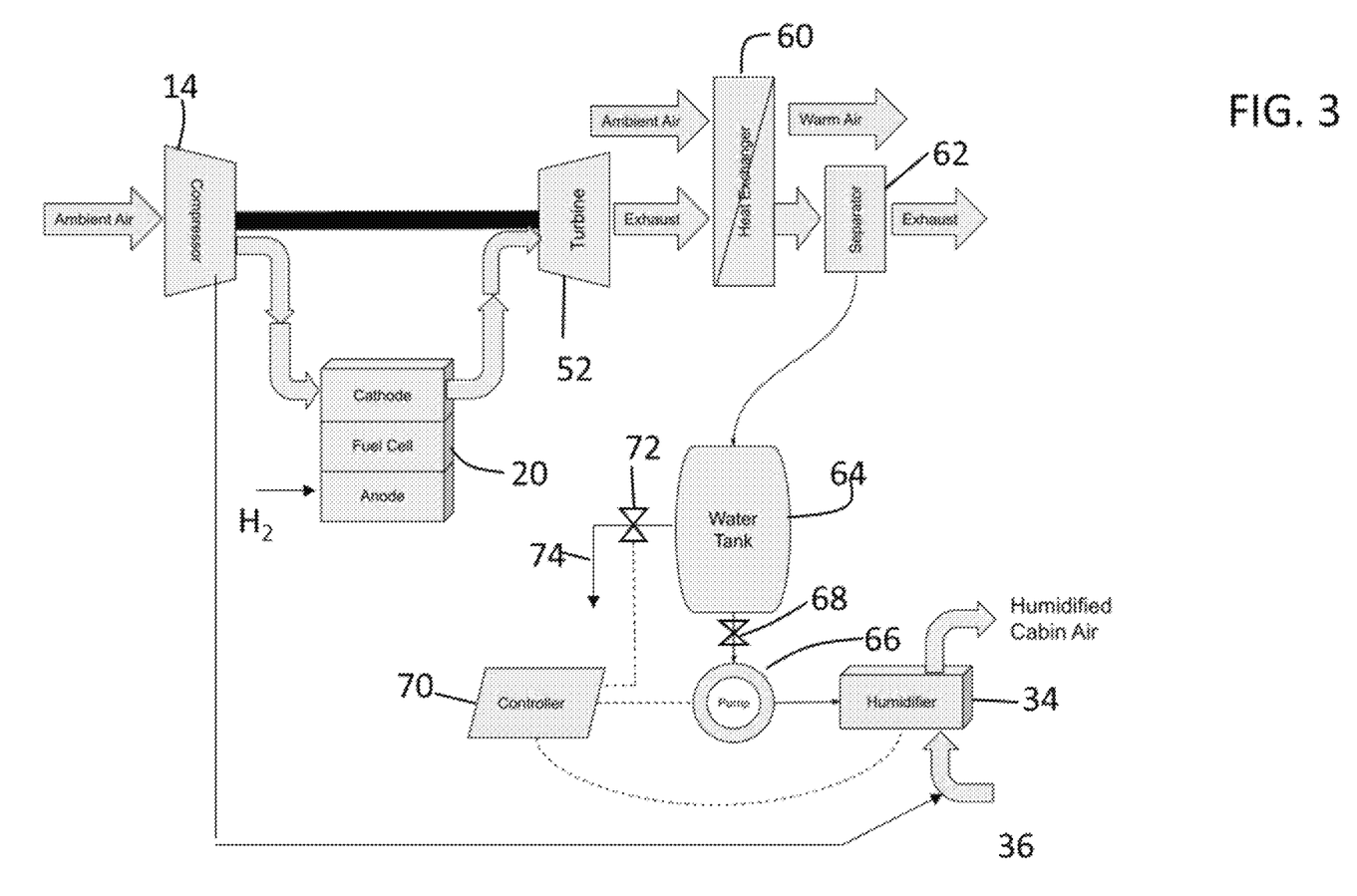
FIG. 3 is a view similar to FIG. 1 and illustrates yet another alternative embodiment of the disclosure for aircraft interior air humidification.

FIG. 3 is similar in part to FIG. 2. Accordingly, for convenience, certain elements, e.g., intercooler 18, $H_2$ tank 16, electric motor 22, and regulation and control module 35 have been omitted for simplicity of illustration. In the FIG. 3 embodiment, compressor 14 is also used for cabin and/or cockpit pressurization.

Referring in particular to FIG. 3, the exhaust from turbine 52 is passed through a heat exchanger 60 where the warm, moist air is cooled by heat exchange with ambient air. The cooled, moist air is then passed through separator 62 where liquid water is separated from the cooled, moist air. The resulting separated water is then passed to a water tank 64 for storage, and the stored liquid water is then supplied via pump 66 and valve 68 to humidifier 34 where dry, conditioned, cabin and/or cockpit air is passed through the humidifier for humidification as before. Pump 66 and valve 68 are controlled by controller 70, which also controls valve 72 for disposal overboard of excess water accumulating in tank 64 via line 74.

Figure 4:
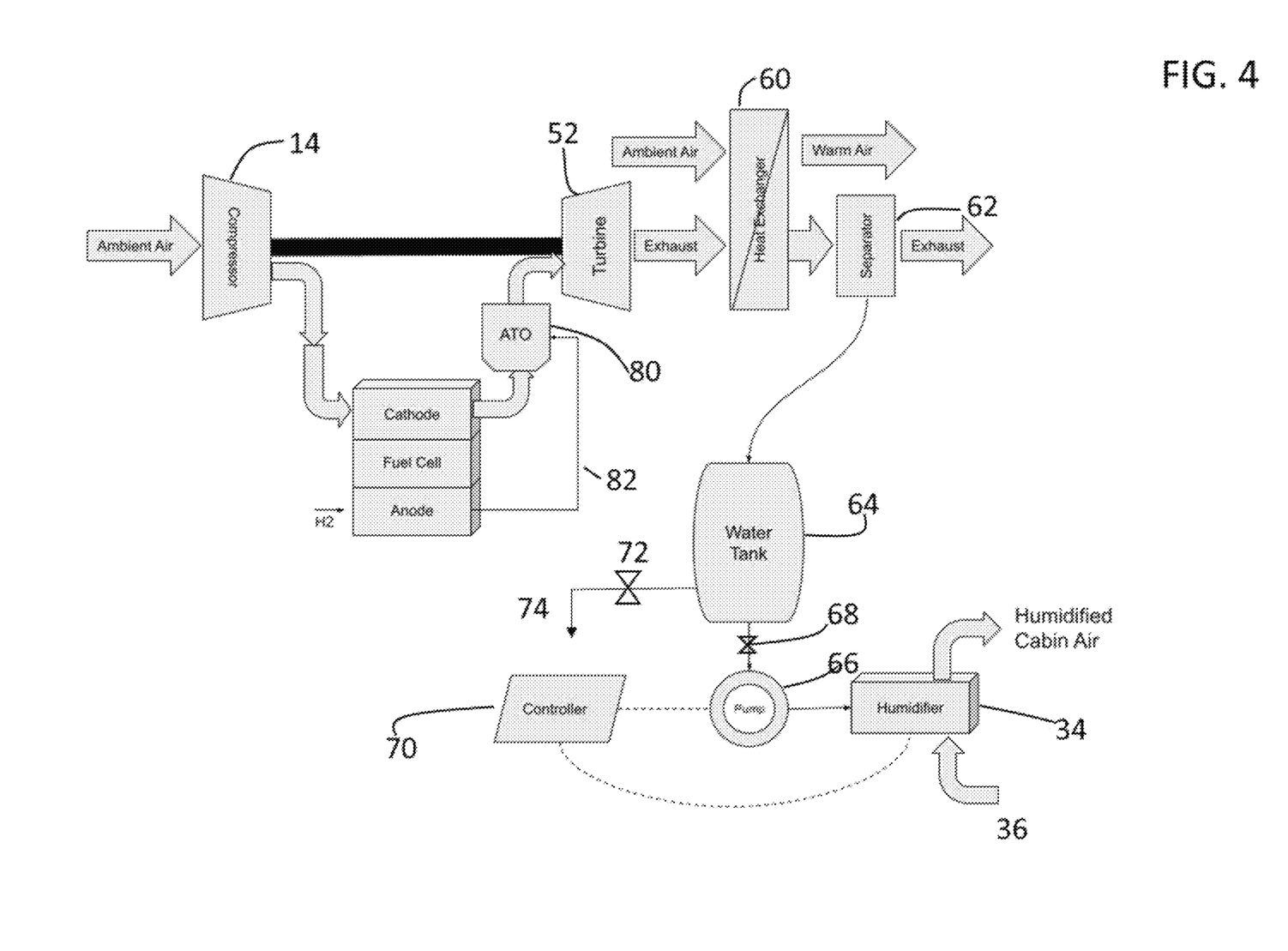
FIG. 4 is a view similar to FIG. 1 of yet another embodiment of the disclosure for aircraft interior air humification.

FIG. 4 illustrates yet another embodiment of the disclosure. FIG. 4 is similar to the FIG. 3 embodiment and includes a water tank 64 for storing separated water. As before, elements such as hydrogen-fuel tank 16, electric motor 22, and regulation and control module 35 are omitted from the drawings for the sake of simplicity. The FIG. 4 embodiment adds an anode tail oxidizer (ATO) 80. In operation, the fuel cell anode exhaust, while still at elevated pressure, is passed via conduit 82 to the ATO 80. ATO 80 includes a catalyst and/or burner to combust any unreacted hydrogen gas in the anode exhaust. The resulting exhaust from ATO 80, which includes moisture produced by combustion of the hydrogen gas in the ATO, as well as the moisture resulting from hydrogen consumed in the fuel cell, is then passed to turbine 52. After passing through turbine 52, the exhaust is then passed through heat exchanger 60 and from there to water separator 62 where water in the cooled exhaust is condensed and separated from the cooled exhaust gasses and passed to water tank 64 for use in humidifying the cabin and/or cockpit air, as before. In other embodiments water collected in water tank 64 may be supplied for consumption onboard the aircraft, e.g., for sinks, flushing lavatories, or drinking.

Figure 5:
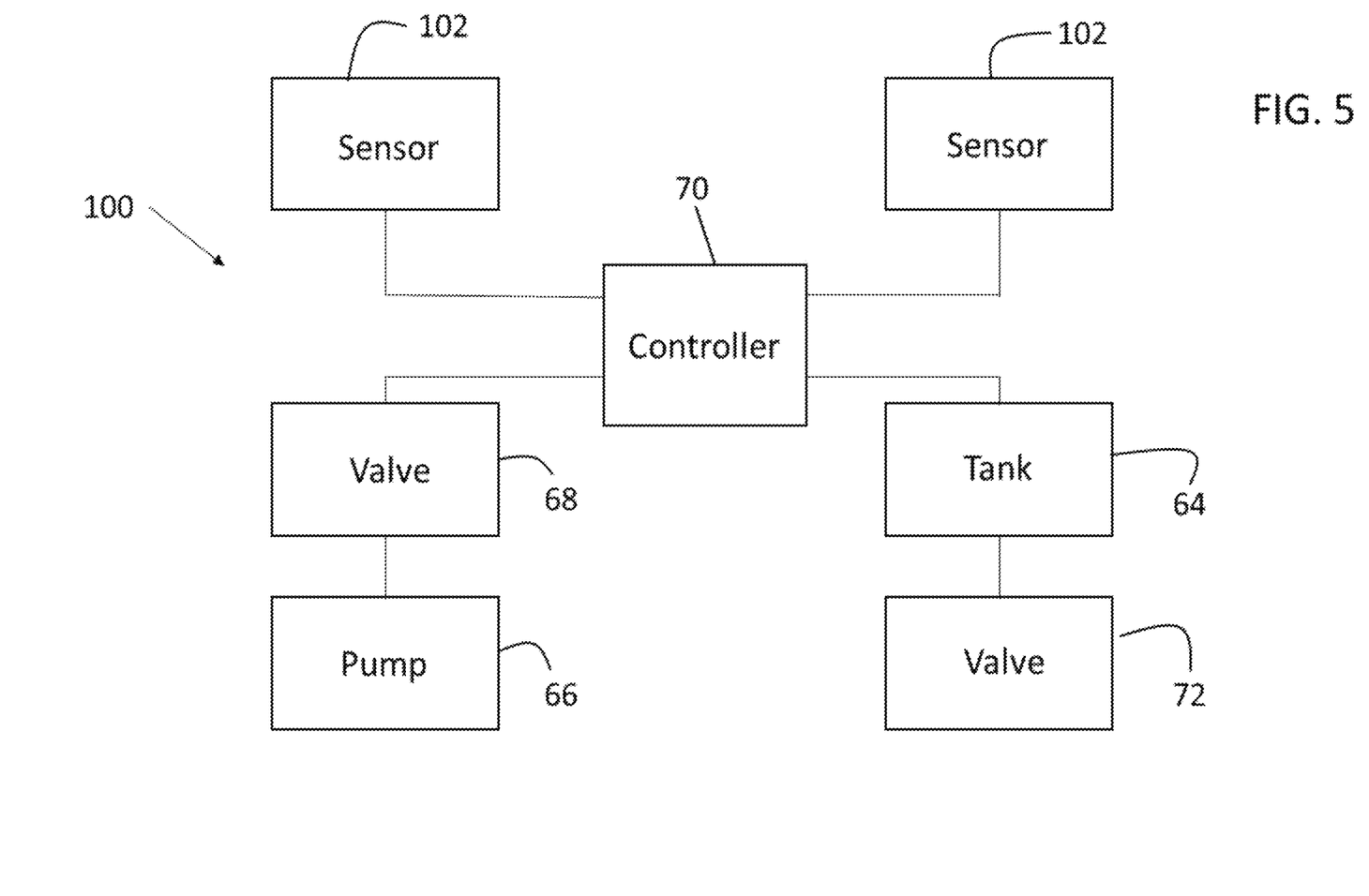
FIG. 5 is a block diagram illustrating control of a humidification system employing harvested water from a hydrogen fuel cell in accordance with the present disclosure.

Referring to FIG. 5, an exemplary control system 100 in accordance with the present disclosure includes a humidity sensor or sensor(s) 102 configured to sense relative humidity of the air in the plane cabin and/or cockpit. Sensors 102 are operatively connected to controller 70 which is operatively connected to pump 66 and valves 68 and 72. Controller 70 is programmed to open valve 68 and to activate pump 66 and humidifier when the relative humidity measured by sensors 102 falls below a target value, e.g., 40%. Controller 70 is also programmed to open valve 72 to dispose overboard excess water in tank 64, for example, before the aircraft launches.

Figure 6:
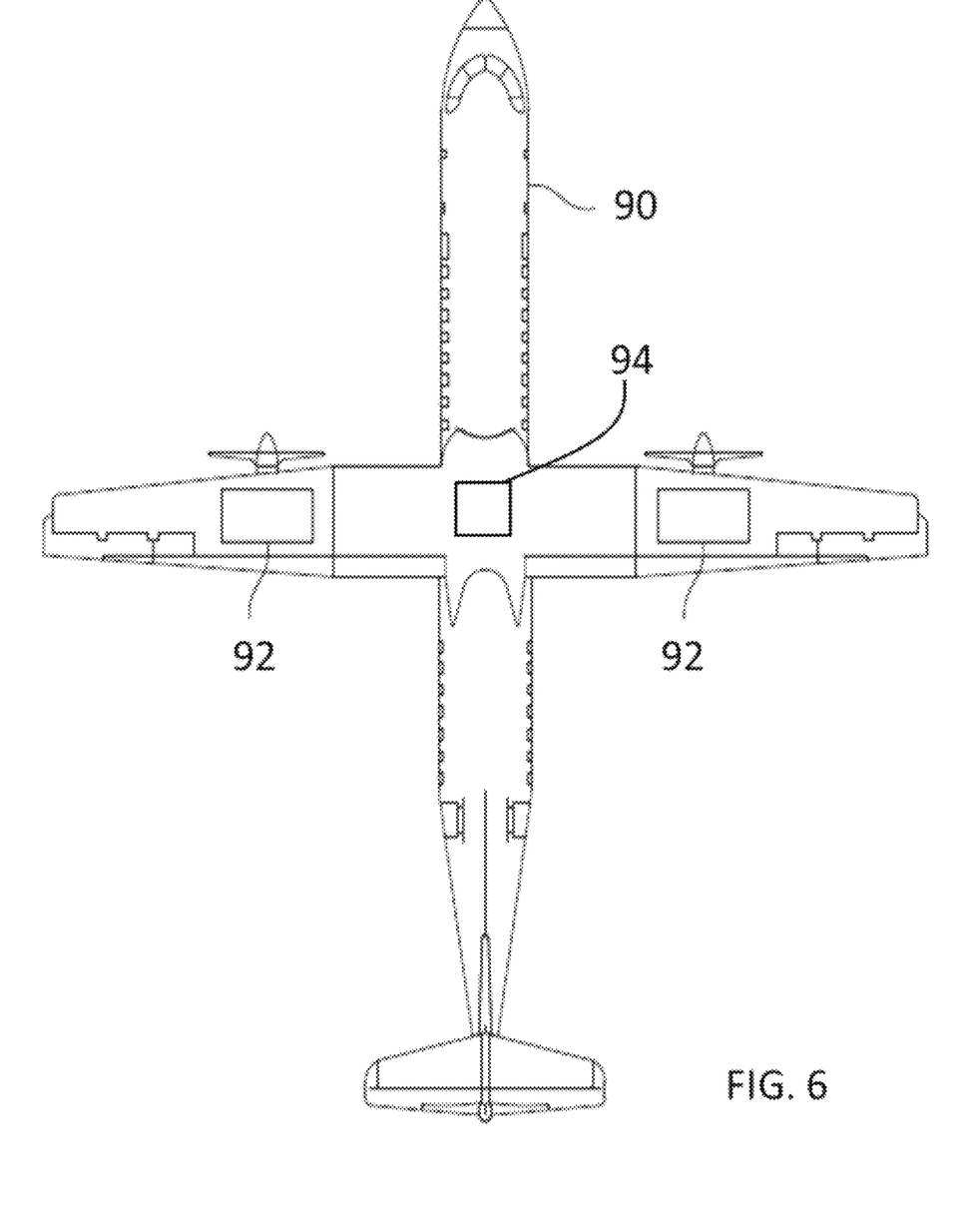
FIG. 6 is a schematic view of a hydrogen fuel cell aircraft having a cabin and/or cockpit air humidification system in accordance with the present disclosure.

FIG. 6 illustrates an aircraft 90 including an integrated fuel cell electric system 92 and including a liquid-water exhaust harvesting and humidification system 94 in accordance with the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Various changes and advantages may be made in the above disclosure without departing from the spirit and scope thereof.

What is claimed:

1. A system for humidifying air in a cabin and/or cockpit of a fuel cell powered aircraft system comprising:
   a fuel cell configured for reacting hydrogen and oxygen to produce electrical energy and a cathode exhaust comprising moist air;
   a water separator comprising a condenser configured to condense and separate liquid water from the moist air;
   a turbine upstream of the condenser;
   an air system configured to circulate pressurized air through and/or introduce pressurized air into the cabin and/or cockpit; and
   a humidifier configured to employ the separated liquid water to humidify the air in the cabin and/or cockpit.

2. The system of claim 1, wherein the water separator includes an air-cooled heat exchanger and a water separator between the turbine and the humidifier.

3. The system of claim 2, further comprising a tank configured for storing the separated liquid water upstream of the humidifier.

4. The system of claim 3, further including a pump configured to pump the separated liquid water from the tank to the humidifier.

5. The system of claim 4, wherein the tank includes a water overflow for discharging excess separated liquid water from the tank.

6. The system of claim 5, further comprising a controller configured to control the humidifier, the pump, and/or water overflow.

7. The system of claim 1, further including an air compressor upstream of the fuel cell wherein the air compressor is configured to deliver compressed air to the fuel cell and to deliver pressurized air to the cabin and/or cockpit.

8. The system of claim 1, further comprising an anode tail oxidizer downstream of the fuel cell and upstream of the turbine, configured to combust unburned hydrogen gas exiting the fuel cell.

9. The system of claim 1, further comprising a controller configured to control the humidifier to maintain humidity of the pressurized air to a setpoint.

10. The system of claim 9, wherein the setpoint is about 40%.

11. The system of claim 1, wherein the pressurized air comprises cabin and/or cockpit recirculated air.

12. The system of claim 1, Wherein the pressurized air includes exterior air.

13. A method for humidifying air in a cabin and/or cockpit of an aircraft powered by a fuel cell, comprising the steps of:
   (a) providing a system as claimed in claim 1;
   (b) controlling the humidifier to add humidity to the air in the cabin and/or cockpit to a setpoint; and
   wherein the system includes an anode tail oxidizer configured to combust unburned hydrogen exiting the fuel cell, including a step of harvesting water from the combustion of the unburned hydrogen.

14. The method of claim 13, wherein the system includes a tank for storing water separated by the system and including a step of disposing of excess liquid water to minimize aircraft weight for takeoff and climb.

15. The method of claim 14, wherein the excess liquid water is stored in the tank to increase speed or range of a gliding descent of the aircraft.

16. The method of claim 15, wherein the excess liquid water is used to supply consumption onboard the aircraft.

17. The method of claim 13, where the humidifier adds humidity to the cabin and/or cockpit air prior to the air being compressed.

\* \* \* \* \*